United States Patent
Pang

[15] 3,637,476
[45] Jan. 25, 1972

[54] METHOD OF RECOVERING METALS

[72] Inventor: Michael Pang, Stamford, Conn.

[73] Assignee: American Cyanamid Company, Stamford, Conn.

[22] Filed: Sept. 11, 1969

[21] Appl. No.: 856,960

[52] U.S. Cl. ............................................................204/106
[51] Int. Cl. .............................................................C22d 1/16
[58] Field of Search..........................................204/106–108; 260/270, 287; 23/340

[56] References Cited

UNITED STATES PATENTS 3,224,873  12/1965  Swanson................................204/106
3,262,870  7/1966   Harlan....................................204/106

Primary Examiner—John H. Mack
Assistant Examiner—R. L. Andrews
Attorney—Samuel Branch Walker

[57] ABSTRACT

Copper is recovered from ores, or slags, or tailing piles, in which the cupriferous material is finally subdivided by leaching with a dilute aqueous acidic leach solution, the leach solution separated from insolubles, and the copper extracted using as extractant a long chain alkyl quinaldinic acid, such as 6-dodecylquinaldinic acid, in an organic solvent system, such as 75/25 kerosene/aromatic petroleum fraction and which may contain up to 25 percent of a $C_9$ to $C_{14}$ alkanol, the organic extractant in solution separated from the aqueous leach solution, and the copper stripped from the organic extractant by strong sulfuric acid, the copper being stripped as copper sulfate in acid solution, from which copper is recovered as electrolytic grade copper by electrolysis.

New quinaldinic acids and methods of synthesis are disclosed.

5 Claims, 1 Drawing Figure

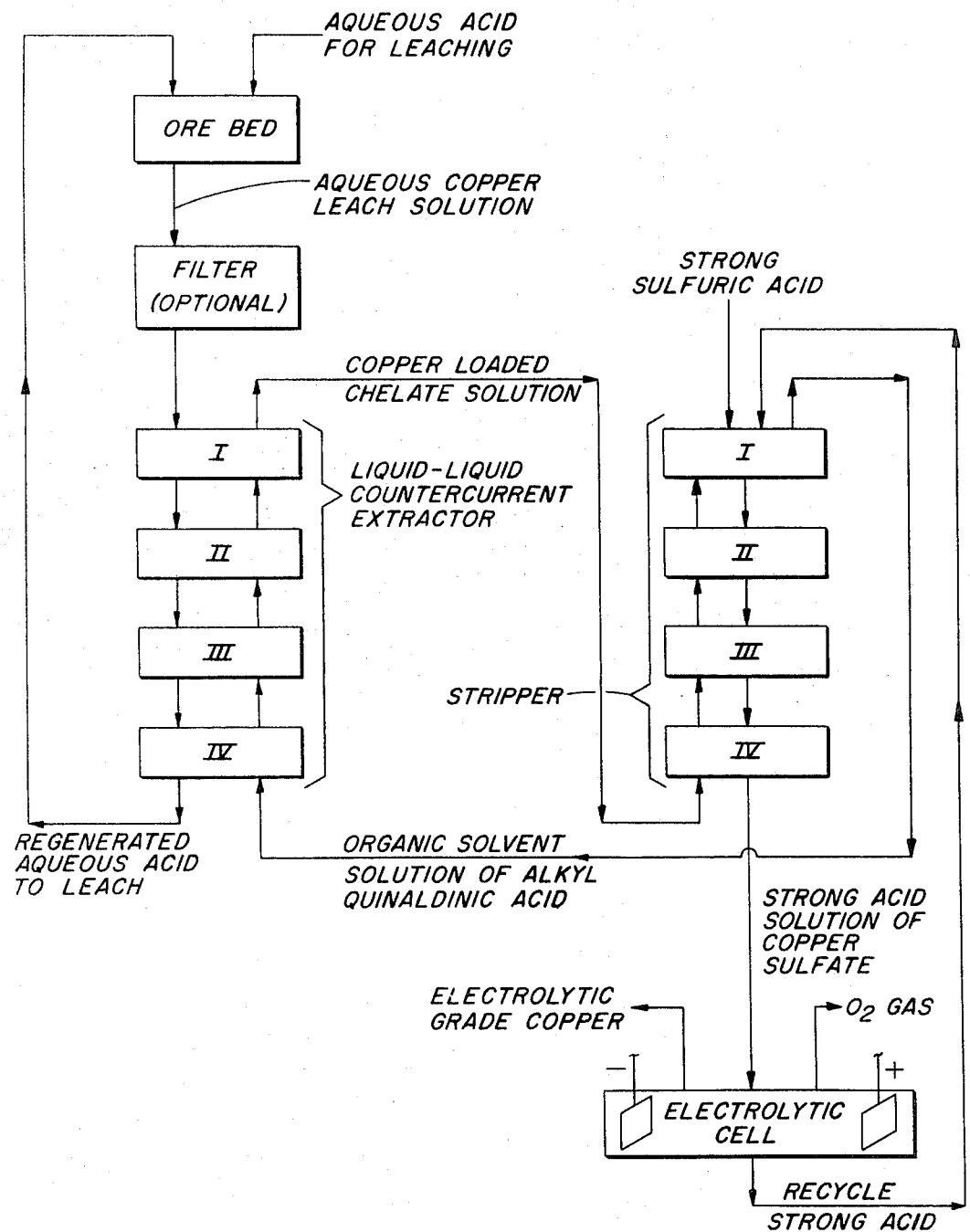

METHOD OF RECOVERING METALS

BRIEF SUMMARY

This invention relates to the treatment of copper-containing ores and ore fractions, including slags, particularly processes in which copper is leached by aqueous acid, particularly sulfuric, and is extracted from the acidic aqueous leach solution with an oil-soluble, water-insoluble long chain alkyl quinaldinic acid dissolved in a water-insoluble organic solvent, and more particularly in which the raffinate from the extraction is recycled to leaching, and the extract is stripped of the copper with more concentrated aqueous acid, with recycling of the organic solvent containing the long chain quinaldinic acid, and to methods of making such acids, and the quinaldinic acids themselves.

At present copper sells about 45 to 50 cents per pound.

Even though the value per pound of the long chain alkyl quinaldinic acid is considerably greater than that of the copper, losses during the processing are kept minimal, with a very economical overall cost of recovery as compared with other known methods of copper beneficiation.

Solvent extraction for copper recovery is described in Lower, U.S. Pat. No. 3,429,694 Recovery of Copper and Cyanide from Solutions Thereof By Solvent Extraction. Recovery by solvent extraction from acid circuits is generalized in Cahalan, Solvent Extraction of Copper Recovery Some General Considerations, Chemistry and Industry, 610 Apr. 15, 1967). Chem & Eng. News, (Apr. 17, 1967 Ion Exchange Recovery of Copper Promising, mentions certain oximes as extractants, as does U.S. Pat. No. 3,244,873, Swanson, Liquid-Liquid Recovery of Copper Values using α-Hydroxy Oximes. Netherlands Pat. application No. 6,610,314 (priority claimed of U.S. Ser. No. 432,903 of Feb. 15, 1965) discloses other hydroxybenzophenoximes in solvent extraction of copper.

Quinaldinic acids have been described; for instance Majumdar, Quinaldinic Acid as a Reagent for the Separation and Determination of Copper and Cadmium, Analyst, 64, 874 to 876(1939) shows quinaldinic acid as an analytical reagent. Pertinent references are cited.

Popp, Reissert Compounds, Advances in Heterocyclic Chemistry, vol. 9, Academic Press, New York (1968) is a review article with 63 references, mentioning among other methods, certain syntheses of quinaldinic-type compounds.

Where not otherwise limited by context, the term "ore fraction" is intended to include the ores themselves, in place or as mined, crushed or ground to treatable size, both rich and lean, as well as selected portions such as fines or slimes from any of the grinding operations, before or after flotation, sands or any sands fractions of any size in which the reduction of ore particles is small enough that an economic fraction of the copper-containing minerals are exposed to action by reagents, also cleaner tailings, rougher tailings, rougher concentrates, cleaner concentrates, and slags, including converter slags and reverberatory slags. With slags, grinding or other methods of attrition may be necessary in order that the subdivision be fine enough to permit attack on the individual copper-bearing particles by acid solution.

The ore fraction may contain both sands and slimes. The slimes are the finely divided, difficulty filterable particles, which frequently are difficult to handle because of the large surface to weight ratio. Sands are larger particles, usually from a classification step, frequently using a cyclone, and are more amenable to flotation. Hence, circuits are useful in which the slimes are treated directly with acid leaching, and the sands are floated, with part or all of the concentrate sent to the smelter as in conventional processing, and with part of the tailings, or cleaner tailings being treated by acid leaching.

Ores may be leached in place without mining by injecting water and/or acids such as sulfuric into copper bearing formations. The resulting acidic copper-bearing solutions are collected by various methods and are treated by the extractants of this invention. Copper-bearing mine waters also may be so treated.

The economics of leaching of each copper-bearing ore or ore fraction may be separately considered. The preferred circuit varies with the type of ore treated, the richness of ore, and cost and availability of water, acid, the organic solvent and the long chain alkyl quinaldinic acid extractant. The most economical circuit for a specific ore or ore fraction can be chosen using the principles set forth herein as applied to the conditions that prevail at a specific ore processing operation.

The present process gives best results with oxide ores, and ores that are easily oxidized.

One very useful process is to leach tailing piles with dilute sulfuric acid, with the aid of bacterial action, and by percolation of acid through the tailing piles. The process may take years. More rapid leaching is sometimes preferred as in vat leaching or by agitating the ore fraction in acidic solution.

Acid extraction is useful in flow sheets in which sulfide copper is floated, and residual oxide copper is acid leached, as well as in processes in which sulfides are oxidized to the copper oxides by roasting, or slow oxidation at ambient temperatures. Some forms of sulfide copper are dissolved in dilute acids at rates which are attractive, without further treatment. Bacterial action aids the leaching operations.

As used herein, the term "sulfide ores" includes those containing the more common sulfide minerals, such as chalcocite ($Cu_2S$), digenite ($Cu_9S_5$), and covellite ($CuS$), as well as mixed sulfides such as bornite ($Cu_5FeS_4$), enargite ($Cu_3AsS_4$), and tetrahedrite ($Cu_{12}Sb_4S_{13}$). Chalcopyrite also may be present.

The term "oxide ores" is used to cover the ores in which the copper occurs as an oxide or carbonate such as azurite ($CuCO_3 \cdot Cu(OH)_2$), malachite ($Cu_2(OH)_2CO_3$), cuprite ($Cu_2O$), tenorite ($CuO$) and forms of chrysocolla, which is a silicate mineral of copper.

The term "mixed ores" is used to cover ores in which the copper occurs as both sulfide minerals and oxide minerals and the proportion of each is large enough that for reasonable economic recovery both types of copper minerals need to be considered in the treatment. Sulfide ores which are completely free from oxide, or oxide ores which are completely free from sulfides are unusual. Ores exist in which the proportion of oxides in a sulfide ore or sulfide in an oxide ore is so low that for metallurgical recovery purposes the ore may be considered as essentially the sulfide or an oxide type. Similarly, in working with slags the same classification can be used and in working with ore fractions the same terminology is applicable.

Similarly, scrap metal, or metal containing industrial waste products may contain enough acid soluble copper that recovery of the copper is economical, such scrap or metal may be considered an ore for present purposes.

The acid in which the copper is dissolved, called the leach acid, is usually a dilute sulfuric acid, not necessarily pure. Other low-cost acids, such as hydrochloric acid, or nitric acid can be used. Because sulfuric acid is usually lowest in cost, sulfuric acid is the leaching acid of choice. As described below, part of the acid may be recycled to the process, and part of all of the acid can be produced in ore processing. For example, sulfide ores may be roasted and the sulfur recovered as sulfur dioxide or converted to sulfuric acid, and the acid as so recovered may be used for leaching ore fractions.

Particularly in leaching ore piles such as tailing dumps, and overburden containing low-copper values, the rapidity of leaching is not important, and slow percolation of dilute acid over a period of months or years gives good results. For such slow leaching, a dilute acid at a pH of 1 to 6 gives good extraction. More concentrated acid solutions give faster leaching. A warmer leaching acid extracts the copper more rapidly, and has lower viscosity, but usually the leaching is carried out at ambient temperatures, without added heat. Such temperatures can be from just above freezing to over 100° F. (38° C.) during the summer or in the tropics.

The organic phase for the extraction must be water insoluble and preferably very insoluble to reduce losses. The solubility in water at 25° C. should be below about 0.1 percent and preferably below 100 parts per million reduced losses in the aqueous phase being extracted. A fraction which is more soluble may be used if available at a price that makes losses, including losses of the said quinaldinic acid, acceptable. The specific gravity needs to be different from the aqueous phase to permit fast phase splitting. Theoretically, a fraction heavier than water can be used, but economically present prices dictate solvents lighter than water. A specific gravity of less than 0.9 is preferred for fast separation; even lower gives faster separation. The organic phase should be a liquid at the temperature of operations and for economic operations must be low in cost.

Theoretically, liquid aliphatic hydrocarbons, pure or mixed, including cycloaliphatic hydrocarbons and aromatic hydrocarbons, including arylalkyls are satisfactory. Chlorinated or other halogenated comparable solvents may be present in the solvent.

From cost considerations aliphatic fractions from petroleum distillation, such as kerosene, are most advantageous. Monocyclic aromatic fractions, such as benzene, mixed xylenes, and toluene, and petroleum fractions containing some proportions thereof give improved solubility to the long chain quinaldinic acid and its copper chelates. Fuel oils are often advantages commercially. If more volatile than kerosene, the flammability and loss by volatilization becomes high and if must higher boiling that the kerosene range, the viscosity becomes high and, hence, disadvantageous. Among the aromatics, aromatic fractions from petroleum distillation, are economically advantageous. Preferably fractions are used with a flash point above operating temperatures.

These materials are available under such trade names as Varsol, Solvesso, etc. Pure materials give excellent results but the choice is usually the cheapest available organic solvent, usually a mixture and not particularly pure, often a petroleum fraction of mixed aliphatic and aromatic compounds. A solvent of low flammablity is preferred to avoid fire hazards. Kerosene has a boiling point of about 150° to 300° C. which is a boiling point high enough to keep evaporation losses within reasonable limits. The aromatic petroleum fractions in the same boiling point range are versatile and useful when available at a competitive price.

A mixture of kerosene and an aromatic petroleum fraction is both effective and economical. From the standpoint of extraction efficiency, benzene, toluene and low-boiling kerosene is very effective but may be a fire hazard.

Commercially available aromatic petroleum fractions with a flash point of over about 125° F. (52° C.) are better from the fire hazard viewpoint. In general, the flash point of the solvent system in use should be at least 100° F. (38° C.) and preferably 125° F. (52° C.).

Ethyl ether is an excellent solvent for the organic extractant, and but for the fire hazard could be used advantageously. Because ethyl ether is so very flammable, its use in large scale commercial operations is avoided.

An intermediate chain length alkanol, that is one with from about nine to 14 carbons in the alkanol, and commercial mixtures thereof aid in keeping the long chain alkyl quinaldinic acid and its chelates in solution. Up to 25 percent by weight can be used. Usually from about 5 to 10 percent aids in solubilization, at lowest costs. Decanol with a flash point of about 356° F. (180° C.) is available in commercial grades and is used advantageously. Isodecanol and dodecanol are also commercially competitively priced and useful.

Optimum operating conditions vary with various ores, leach acids copper concentrations, and long chain quinaldinic acid concentrations.

The organic extractant and its copper chelates must be soluble in the organic carrier solvent. The water solubility of the organic extractant and its copper chelates should be less than about 50 parts per million and preferably less than about 10 parts per million, to avoid undue losses.

The organic extractant should be nonemulsion forming so as to allow rapid and clear phase separation of the organic layer from the aqueous layer. Phase separation times of less than 5 minutes are desirable but under certain conditions longer times may be tolerated depending on local conditions, including tonnage throughput and the nature and size of extracting equipment available. A centrifuge aids in removing the smaller particles of the organic solvent rapidly.

One of the classic reactions for organic chemistry is the Skraup synthesis in which aniline is heated with glycerol and nitrobenzene in the presence of sulfuric acid to yield quinoline. substituted quinolines.

It has now been found that substituted anilines in which there are one or more alkyl groups in the 3, 4, or 5 positions also may be reacted under similar conditions to yield quinoline. Depending upon the size of the vessel, heat may be generated so vigorously that external cooling is required to maintain the temperature at that desired, or in other conditions the heat losses from the equipment will be such that heat must be added. Because glycerol is dehydrated to acrolein, it would appear from theory, and appears in fact, that acrolein can be used in the syntheses; however it is preferred that glycerol be used as starting material and the dehydration occur in situ. Conveniently the sulfuric acid is put in the reactor and a mixture of the substituted aniline, glycerol, and nitrobenzene added thereto with stirring. The vigor of the reaction depends in part upon the substituents on the the aniline and may occur from near room temperature to around 135° C. Frequently it is convenient to add the reactants at below 100° C. preferably around 60° to 90° C. and then heat to between 120° and 140° C. to complete the reaction. After the reaction, the residual nitrobenzene is removed as for example by steam distillation, additional water added and the aqueous layer discarded. The organic product may be washed with caustic to neutralize any residual acid.

The conditions described are unique to the preparation of long chain alkyl quinolines. In the original Skraup synthesis, concentrated sulfuric acid (96 percent) is added slowly to a mixture of aniline, nitrobenzene, glycerol, boric acid and ferrous sulfate. When this procedure is employed with long chain alkyl anilines, the reaction mixture gels during the sulfuric acid addition. This gelation presents mechanical stirring problems and may result in a hazardous condition, particularly in large scale operation, in which it is difficult to control the highly exothermic Skraup reaction. Moreover, the presence of reaction moderators such as ferrous sulfate and boric acid is undesirable because because the product long chain alkyl quinoline is not readily steam distilled out of the reaction mixture. These difficulties are prevented by reversing the order of addition and by using 80–85 percent sulfuric acid, preferably about 82 percent. These conditions avoid gel formation; thus, the synthesis can be carried out smoothly by adding a mixture of nitrobenzene, glycerol and alkyl aniline to 82 percent sulfuric acid.

The alkyl quinoline is dissolved in a solvent such as methylene chloride or other inert solvent and stirred with an aqueous solution of sodium or potassium cyanide. To the stirred mixture is added benzoyl chloride. This is a classic Reissert reaction. The cyanide adds to the 2 position while the benzoyl group adds to the nitrogen. After this reaction is completed, the reactor may be cooled, the mixture stirred with water and the aqueous layer separated and discarded. To the organic layer is then added concentrated hydrochloric acid slowly at about room temperature, followed by heating to 75°–90 C. for 1–4 hours to effect hydrolysis of the nitrile to the carboxylic acid group. The product alkyl quinaldinic acid can be separated by distilling off the benzaldehyde by steam distillation, discarding the aqueous layer, dissolving the thus formed quinaldinic acid in a solvent such as hexane, washing with caustic, then acid, and then water to obtain the alkyl quinaldinic acid.

The product alkyl quinaldinic acid can also be conveniently isolated by steam distilling the hydrochloric acid-organic layer which effects the hydrolysis reaction and the removal of benzaldehyde simultaneously. This one-step process has the additional advantage over the two-step heating-distilling process of minimizing the formation of byproduct benzoin.

The sum totals of the carbons in the 3, 4, and 5 positions of the aniline should be between about 6 and about 30. The alkyl groups can be branched and but for cost considerations could have substituents such as chlorine or alkoxy groups thereon. Any groups which do not impair the oil solubility and are inert under the conditions of extraction of copper are acceptable but from cost considerations it is usual to have only the six to 30 carbon alkyl substituents. A substituted glycerol could be used so that a product is obtained which also has a substituent in the 4 position on the product quinaldinic acid; however the presence of substituents on the glycerol complicates the yields in the syntheses. The reactions may be illustrated by the following equations:

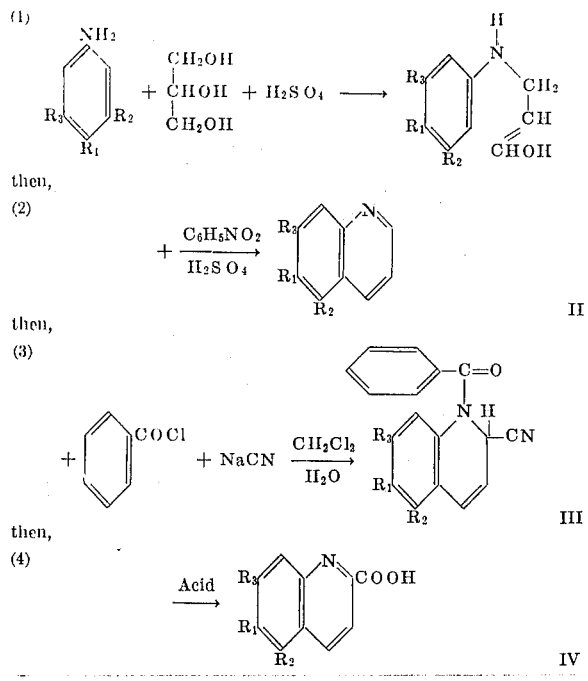

As is obvious, the long chain alkyl quinaldinic acid can be a mixture of alkyl quinaldinic acids. A convenient starting material for commercial syntheses is a technical or crude grade of p-dodecylaniline. As commercially available this material has a plurality of different alkyl groups in the para position ranging from about six to 18 with an average of about 12. Some of the commercial grades have at least 50 percent of dodecylaniline in the technical grade. A pure compound, or a mixture of pure compounds may be used, but as cost considerations in copper refining are extremely important, the lower cost technical grades are normally used and are a mixture of various p-alkyl anilines. The chelating ability is a molar function and hence the larger the alkyl groups, the lower the chelating capacity per pound of the long chain quinaldinic acid; on the other hand the introduction of additional alkyl groups appears to aid solubility in the oil phases. An effective compromise occurs at about the p-dodecyl quinaldinic acid and hence, because of this and the commercially availablility of the technical grade p-dodecyl aniline as a starting material, such material is usually the starting material of choice.

DRAWINGS

A flow sheet of the extraction appears in the attached drawing. As the drawing shows, an ore bed is leached with aqueous acid. Sulfuric acid is usually the cheapest and, therefore, the acid of choice. The ore bed may be tailing piles or it may be overburden or any of the various forms in which copper-bearing ores occur. The use of leach tanks is successful, but it is also convenient to use piles of ore material with the sulfuric acid being added at a slow rate, percolating through the dissolving the copper. Copper oxide ores are more readily dissolved than the sulfide ores, but bacteria and ambient atmospheric oxygen tend to aid oxidation of sulfide ores to facilitate leaching. Some of the sulfides are themselves soluble in acids. When the extraction is from an ore bed which is leached by percolation, extended periods of years may be used for the leaching and hence slow oxidation is satisfactory. Strong acids leach more rapidly, but on the other hand, strong acids are more expensive, so that acids at a pH from around 1 to 5 are frequently used for leaching.

The aqueous copper leach solution may be filtered if there are fines present, and then fed to a liquid-liquid extractor in which the copper is extracted as a chelate of the alkyl quinaldinic acid dissolved in the solvent phase. A counter current extractor is preferred in order that the fresh organic solvent containing the alkyl quinaldinic acid extracts from the acid solution having the lowest copper and as the copper loading of the organic phase increases it comes in contact with the fresher and hence higher copper concentrations in the aqueous acid leach liquor. As the quinaldinic acid forms a chelate with the copper, protons are released and these, together with the sulfate ions or other anions in the leach solution remain in such solution and reform the acid so that the leach solution becomes more acidic, and the regenerated aqueous acid may again be recirculated to leach additional ore. More dilute acids are used on the lower grade ore beds and wash water may be used to recover some of the acid from the ore beds. Depending upon the water content of the ore beds in which initial leaching occurs, ambient rainfall and other conditions, the total circulating acid may build up and if a build up occurs, the more dilute acids containing a minimum of copper may be discarded.

The copper loaded chelate solution is passed to a second liquid-liquid extraction system which is also a counter current type in which a strong acid, such as about 15–20 percent or stronger sulfuric acid is introduced counter current to the copper loaded chelate solution with appropriate mixing to insure agitation and hence stripping. The strong acid dissolves the copper as copper sulfate and is passed to an electrolytic cell. The copper sulfate is electrolyzed, regenerating sulfuric acid and yielding an electrolytic grade of copper. The acid produced by the electrolytic cell is recycled with additional makeup acid added as required to the stripping column.

Normally the organic phase is adequately separated in the counter current stripping system but if complete separation does not occur, an additional amount of organic solvent can be added and the organic solvent used as a wash to protect against loss of the long chain alkyl quinaldinic acid which is the most expensive component of the recovery system.

Filters or centrifuges and flotation equipment may be used to aid in a highly effective recovery of the organic phase. The ratio of the long chain alkyl quinaldinic acid, hereafter in part abbreviated AQA, in the solvent phase may be from less than about 1 percent to more than 20 percent. It is desirable that the quantity of the AQA be less than that soluble in the solvent to avoid possible losses, and around 5 percent is frequently an economic maximum. The AQA and its copper chelate must be soluble in the solvent under the conditions of use. If the extraction is made in very cold weather, the concentration may be less than when the temperature is higher.

The total volume of AQA loaded organic solvent needs to be such that the chelating ability of the AQA is sufficient to remove all of the copper in the copper leach solution. Depending upon the copper concentration, this can be from around 25 percent of the volume of the leach solution or if the copper load is low it may be down to 5 percent or 1 percent or less. The counter current extraction system permits effective loading with a high percentage of the theoretical copper content based on the AQA content.

The copper is extracted from the copper containing solvent phase by sulfuric acid preferably at least about 15–20 percent and which may run up to 50 percent or more. Around 20 to 30 percent gives good results and is a good feed for an electrolytic cell in which the copper is recovered by electrolysis.

AQA is selective toward copper and leaves iron and many other contaminants relatively unextracted in the leach solution. Both the specificity towards copper and the high recovery of AQA insure an economical process for the extraction of copper.

Frequently, it is desirable to float sulfide copper from an ore and treat the tail or other low-grade materials, by an acid leach. This reduces the volume of circulating acid leach solution and the AQA in organic solvent circulating load. If the ore is roasted, all of the copper may be effectively recovered by the AQA organic solvent extraction of the acidic leach solution.

By way of illustration but not limitation, the invention is set forth in the following examples in which all parts are by weight and temperatures centigrade unless clearly otherwise stated:

EXAMPLE I

Preparation of 6-Dodecyquinoline

Introduce 830 parts, by weight, of 82 percent sulfuric acid into a reactor equipped with an efficient stirrer. Mix 522 parts of p-dodecylaniline, 313 parts of glycerol and 148 parts of nitrobenzene and add to the reactor containing the diluted sulfuric acid, while stirring. The reaction temperature rises rapidly. The addition rate of the P-dodecylaniline-glycerol-nitrobenzene mixture is controlled so that the reaction temperature stays between 70° and 80° C.; with external cooling being used to control the temperature rise. The addition takes about 30 minutes. The reactor is heated to between 130° and 140° preferably at 135° and maintained at this temperature for 6 to 8 hours. Then steam is introduced into the reaction mixture to steam distill out all the unreacted nitrobenzene. After the steam distillation, add 500 parts of water, mix thoroughly, and then allow to stand. The aqueous acidic solution, which is the lower layer is removed and discarded. The organic product is washed with another 500 parts of hot water. Enough 20 percent caustic is added to the organic product slowly with rapid stirring so that the reaction mixture becomes basic to litmus. Allow to stand. The aqueous phase separates and is discarded. Wash the product with 500 parts of hot water. A yield of 595 parts is obtained, of which 74 percent is 6-dodecylquinoline, and 26 percent is p-dodecylaniline.

EXAMPLE II

Preparation of 6-Dodecylquinaldinic Acid

Introduce 29.75 parts by weight of distilled 6-dodecylquinoline and 67 parts of methylene chloride into a reactor equipped with an efficient stirrer. Dissolve 11.7 parts of potassium cyanide (KCN) in 16 parts of water and add to the reactor. Stir vigorously while adding a solution of 25.2 parts of benzoyl chloride in 13.4 parts of methylene chloride over a period of 20 minutes, maintaining the temperature at about 25° C. during the addition, and while stirring for an additional hour. 100 parts of water is added, and mixed thoroughly. Allow to stand so that the aqueous solution separates, then discard the aqueous layer. Cool the organic layer to 20° C. Then add 100 parts by weight of concentrated HCl slowly, maintaining the temperature at 20°–30°. Steam distill to remove all benzaldehyde and hydrolyze the nitrile group, then dissolve in about 100 parts by volume of hexane. Wash with 100 by volume portions of 20 percent caustic until the used wash liquor is basic to litmus. Then wash over the dilute hydrochloric acid until the used wash liquor is acid to litmus. A yield of 33 parts of 6-dodecylquinaldinic acid is obtained.

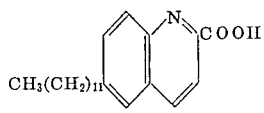

EXAMPLE III

Stir a mixture of 148.7 parts of vacuum distilled 6-dodecylquinoline and 330 parts of methylene chloride in a reactor. Dissolve 44.1 parts of sodium cyanide in 80 parts of water and add to the above. Add a solution of 126 parts of benzoyl chloride in 65 parts of methylene chloride to the reactor at such a rate that the reaction temperature does not exceed 50° C. Cool to room temperature and add 238 parts of concentrated HCl. Heat at about 75°–90° for 4 hours. Steam distill the mixture to remove benzaldehyde, and hydrolyze, and then remove and discard the aqueous portion. Dissolve the organic portion in about 500 parts of ether. Wash the etheral solution twice with 100 part portions of 10 percent caustic and then three times with 100 part portions of 5 percent caustic. Wash the ethereal solution with dilute HCl until the wash liquor is acid to litmus. Wash once with 500 parts of water. Evaporate the ether to yield 93.7 parts of product. Analysis of the product obtained in this manner shows that it contains 78.9 percent 6-dodecylquinaldinic acid, 7.4 percent 6-dodecylquinoline, 3.4 percent benzoic acid and 8.2 percent benzoin.

EXAMPLE IV

Into a reaction vessel, introduce in the following order: 28 grams of ferrous sulfate ($FeSO_4 \cdot 7H_2O$), 59 grams of nitrobenzene, 110 grams of p-dodecylaniline. Heat a mixture of 50 grams of boric acid and 250 grams of glycerol to effect solution; cool to room temperature and add to the the contents of the reaction vessel. Mix thoroughly by stirring. Then add 258 grams of concentrated $H_2SO_4$ slowly to avoid frothing and overheating by the exothermic reaction. The reaction mixture gels. Heat the reaction vessel until the mixture begins to boil (145° C.) Continue heating and allow the reaction to run for 4 hours at 132° and 15 hours at 125°. Without cooling, steam distill until the distillate is free from nitrobenzene. Cool the mixture in the reaction vessel, and add enough 50 percent caustic to make the solution alkaline. Filter the reaction mixture and extract the filtrate with hexane. Evaporation of hexane from the extract yields 38 grams of 6-dodecylquinoline.

EXAMPLE V

Dissolve 4.06 parts of KCN in 25 parts of water and pour into a reaction vessel containing 7.7 parts of 6-dodecylquinoline from example IV. Add 4.2 parts of benzoyl chloride carefully and heat the mixture to 70° for 15 minutes, then cool to room temperature. Add 20 parts by volume of benzene, 20 parts by volume of water and then 20 parts of concentrated HCL. Stir the reaction for 20 minutes and allow to stand until the phases separate. Collect the upper layer and evaporate the benzene under vacuum. A yield of 8.3 parts remains of the dark viscous oil, which is 6-dodecylquinaldinic acid.

EXAMPLE VI

Introduce 80 grams of benzene and 5 grams of $AlCl_3$ into a reactor. Heat, and while stirring, add slowly 147.5 grams of $C_{15-20}$ α-olefin at such a rate that the reaction temperature does not exceed 90°cool to room temperature. Add water to the reaction mixture carefully to decompose residual $AlCl_3$. Distill out excess benzene. The produce (alkyl $C_{15-20}$ benzene) weighs 156 grams.

To the alkyl benzene in a reactor, add a cold mixture of 50 grams of concentrated nitric acid and 50 grams of concentrated sulfuric acid slowly such that the reaction temperature does not exceed 50°, After the addition, heat the mixture for 30 minutes at 50°, then cool to room temperature, and and pour the mixture into a beaker containing crushed ice. Extract the product with ether. Evaporation of the ether yields 171 grams of p-nitro-alkylbenzene.

Mix 107 grams of p-nitro-alkylbenzene with 120 grams of concentrated HCl Add 10 grams of $SnCl_2 \cdot 2H_2O$ and heat the reaction mixture to a temperature of 65°. Add 190 grams of $SnCl_2 \cdot 2_2O$ slowly and after the addition, rise the temperature to 95°. Hold for 40 minutes at 95°, then pour the reaction mixture into 135 milliliters of 40 percent NaOH in crushed ice. The crude p-alkylaniline weighs 110 grams.

Introduced into a reactor in order: 10.5 grams of $FeSO_4 \cdot 7H_2O$, 85 grams of the p-$C_{14-20}$ aklylaniline prepared above, and 23.6 grams of nitrobenzene. Heat a mixture of 20 grams of boric acid and 112.5 grams of glycerol to effect solution; cool to room temperature and add to the reaction vessel. Add 97 grams of concentrated $H_2SO_4$ slowly. The reaction mixture gels. Heat the mixture to boil and then allow to cool to room temperature and is extracted with 500 grams of ether. Wash the ethereal extract with 200 milliliters of 20 percent NaOH Evaporation of ether yields 91 grams of crude 6-alkylquinoline.

Dissolve 2.6 grams of KCN in 20 milliliters of water. Mix 10 grams of the above 6-alkylquinoline with the KCN solution. Add 3.5 grams of benzoyl chloride slowly and after addition, raise the reaction temperature to 50°. After 15 minutes of heating, add 30 milliliters of concentrated HCl and heat the reaction for 30 minutes at 70°. Add about 50 milliliters each of water and either. Collect the organic layer and wash it with 50 milliliters of concentrated HCl and then 50 milliliters of water. Evaporation of ether yields 10.2 grams of 6-$C_{15-20}$-alkylquinaldinic acid.

EXAMPLE VII

Introduced into a reactor in the following order: 56 grams of $FeSO_4 \cdot 7H_2O$, 220 grams of p-dodecylanilne, 60 grams of nitrobenzene and 140 grams of glycerol and 300 grams of concentrated $H_2SO_4$ slowly. The reaction mixture gels. Raise the temperature to boil (155°) and then continued heating for 2 hours at 140°. Steam distill to remove excess nitrobenzene, then discard the aqueous layer. Extract the product mixture with about 500 grams of ether. Wash the ether solution with 400 milliliters of water, 400 milliliters of 10 percent NaOH and then twice with 400 milliliters of water. After the distillation of ether, vacuum distill and collect the fraction between 130–140°0.05 mm. The 6-dodecylquinoline obtained weighs 192 grams.

Mix 150 grams of the 6-dodecylquinoline, 15 milliliters of benzene, 50 grams of NaCN in 200 milliliters of water, then add 140 grams of benzoyl chloride. Cool to room temperature and add 300 milliliters of concentrated HCL. Raise the temperature to near boiling, (90°) and allow to react for 1 hour. Steam distill to remove benzaldehyde. The hot mixture is transferred to a separatory funnel where the organic layer is separated out. Wash with 500 milliliters of 1 percent NaOH and then 5 times with 500 milliliters portions of hot water. Dissolve the product in 500 grams of ether. Wash the ethereal solution twice with 300 milliliters of water. Evaporation of ether yields 170 grams of 6-dodecylquinaldinic acid.

EXAMPLE VIII

Introduced 130.7 grams of p-dodecylaniline, 33.2 grams of nitrobenzene and 69 grams of glycerol into a reactor. Stir thoroughly. Add milliliters of 76 percent $H_2SO_4$ slowly. The reacting mixture thickness and then thins out during the reaction. Heat to 138°–145° and hold for 7 hours. The product is steam distilled until all the nitrobenzene is removed. Cool to room temperature. Add 300 milliliters of hexane and 25 grams of NaOH in 200 milliliters of water. Mix thoroughly, and then allow to stand, discard the aqueous layer, then wash twice with 300 milliliter portions of water. Evaporation of the hexane yields 144 grams of 6 -dodecylquinoline. Vacuum distillation yields 132 grams of pure material.

Dissolve 3.68 grams of NaCN in 8 milliliters of water. Add 14.8 grams of the distilled 6-dodecylquinoline and 8 milliliters of methylene chloride. Mix thoroughly and add 9.14 grams of benzoyl chloride. Raise the temperature to 60° and hold for 20 minutes. Add 20 milliliters of concentrated HCl and heat for 30 minutes at 90°. Wash the product three times with 100 milliliter portions of hot water. Steam distill to remove benzaldehyde. The yield of 6-dodecylquinaldinic acid is 16.8 grams.

EXAMPLE IX

Mix thoroughly 354 parts by weight of distilled 6-dodecylquinoline with 650 parts of methylene chloride and a solution of 102 parts of NaCN in 130 parts of water in a reactor, then add 284 parts of benzoyl chloride, at such a rate that the reaction temperature does not exceed 40° C. Allow to stand at room temperature for 24 hours. Mix thoroughly with 200 parts by weight of water and allow to stand, to separate. The aqueous layer is discarded. Add 238 parts by weight of concentrated HCl and then raise the temperature to 70°–80° C. for 1 hour, then steam distill until the mixture is free from benzaldehyde. Cool the product, and then dissolve in 600 parts of hexane. Wash the solution with 100 parts of 5 percent caustic until the wash the liquor is free from sodium benzoate. Reacidify the product with 500 parts of 6 N HCl and then wash once again with 400 parts water. On standing a solid precipitates out and is isolated yielding 62 parts of product.

Recrystallization with a methanol-water mixture yields 57 parts of while solid which melts at 99°–101° C. Elemental analysis shows that it contains C77.29 percent, H 9.79 percent and N 4.22 percent (theor. for 6-dodecylquinaldinic acid C 77.37 percent; H 9.15 percent and N 4.10 percent). Gel permeation chromatography shows that it has a minimum purity of 98 percent as 6-dodecylquinaldinic acid.

EXAMPLE X

Mix 1001 grams of distilled 6-dodecylquinoline, 1056 grams of methylene chloride and solution of 3.77.4 grams of KCN in 500 grams of water. Cool the mixture to 20° C. and add a solution of 815 grams of benzoyl chloride in 264 grams of methylene chloride, as such a rate that the reaction temperature does not exceed 25° C. The addition taken about 2½ hours. Then stir the mixture for 2 hours 20°–25°C. Wash the product with 500 grams portions of water twice. Add 900 grams of concentrated HCl and mix thoroughly. Steam distill the mixture until free from benzaldehyde, discard the aqueous layer and dissolve the product in about 1 kilogram of ether. Wash the ethereal solution twice with 1 kilogram of ether portions of 20 percent caustic, then with 700 grams of water. Acidify by washing with 500 grams portions of 6 N hydrochloric acid until the wash liquor is acid to litmus. Evaporation of ether leaves 1111 grams of crude product. The product on analysis shows 88.3 percent 6-dodecylquinaldinic acid, 6.8 percent of quinoline, 4.8 percent of benzoic acid and 3 percent of benzoin.

Dissolve the crude product in 3,000 grams of hexane and allow to stand for about 24 hours, The solid precipitated out is filtered and dried. Recrystallization from methanol-water yields 201 grams of white solid, which by analysis contain 94.6 percent of 6-dodecylquinaldinic acid 2.6 percent of benzoic acid and 2.7 percent of benzoin.

EXAMPLE XI

In a well-stirred reactor, to 830 parts of 82 percent $H_2SO_4$ are added slowly a mixture consisting of 313 parts of glycerol, 148 parts of nitrobenzene and 522 parts of p-dodecylaniline, holding the reaction temperature to less than 70°. The reaction mixture remains fluid. Heat to 138°–145°to hold for 7 hours.

The product is steam distilled to remove nitrobenzene. 62 parts of nitrobenzene are recovered from the distillate. The water accumulated during steam distillation is separated and discarded. Without cooling, wash with 100 parts of caustic in 800 parts of water. Repeat the caustic wash with fresh caustic solution if the wash liquor is acidic after the washing. Wash the product once with 1000 parts of hot water. The crude 6-dodecylquinoline yield is 624 parts of 105 percent. The crude product analizes as 73.7 percent 6-dodecylquinoline. Vacuum distillation over 20 parts of zinc powder yields 555 parts of 79.2 percent 6-dodecylquinline.

EXAMPLE XII

Mix 500 grams of p-dodecylaniline with 313 grams of glycerol and 100 grams of nitrobenzene. Add this mixture to a well-stirred reactor containing 774 grams of 88 percent sulfuric acid. The addition rate is controlled so that the reaction temperature does not exceed 70 ° C. After about 60 percent of the mixture is added, the reaction mixture thickens and the stirring efficiency drops drastically. After the addition the reaction temperature is raised to about 135° by external heating. The reaction mixture begins to thin out at about 120°. At 135° the reaction becomes violent and external cooling is applied to control the exotherm. The mixture is then maintained at 138°–145° for 5 hours. The product is isolated ad described in example XI. Distillation of the crude product yields 400 graphs of 6-dodecylquinoline.

EXAMPLE XIII

Mix 210 grams of 6-dodecylquinoline from example XII above with 600 grams methylene chloride in a reactor. Dissolve 62.5 grams of NaCN in 80 grams of water and mix thoroughly with the 6-dodecylquinoline solution. Add 180 grams of benzoyl chloride at such a rate that the reaction temperature remains below 50°. After the benzoyl chloride is added, raise the reaction temperature to 70° and allow the reaction to run at this temperature for 1 hour. Mix thoroughly with 200 grams of water and allow to stand. Discard the aqueous layer. Add 238 grams of concentrated HCl slowly and heat the mixture at 70° for 1 hour. Wash the product mixture with 100 grams of water. Add 123 grams of 10 N sulfuric acid and steam distill until there is no benzaldehyde in the distillate. Discard the aqueous layer and dissolve the organic portion in 500 grams of hexane. Wash once with 500 grams of 5 percent of trisodium phosphate solution, and then 119 grams of concentrated HCL. Wash twice with 500 grams portions of water. After the removal of hexane by distillation, 161 grams of product are obtained, which analysis shows contains 85.2 percent of 6-dodecylquinaldinic acid.

EXAMPLE XIV

A solution containing 1.27 grams of copper and 2.11 grams of iron per liter is obtained by the extraction of an ore sample with dilute sulfuric acid. The solution has a pH of about 2.0. Portions of this leach solutions are extracted with an organic extractant consisting of kerosene (boiling point 150°–300° C.) containing 10 percent by weight of the product of example II.

In one test to illustrate the selectivity of the AQA equal portion of the leach solution of kerosene containing 10 percent AQA were shaken together and the residual aqueous solution was analyzed for both copper and iron by atomic absorption. To illustrate the loading of the organic phase, a single-organic phase was shaken with 5 successive portions of the aqueous leach solution and the loading determined by analysis of the aqueous with organic by difference after each of these shakings and found to be:

|  | Copper concentration grams/liter | | Iron concentration grams/liter | |
| --- | --- | --- | --- | --- |
|  | Organic | Aqueous | Organic | Aqueous |
| 1st Extraction | 1.27 | 0.00 | 0.93 | 1.18 |
| 2nd | 2.54 | 0.00 | 1.00 | 2.04 |
| 3rd | 3.79 | 0.02 | 0.66 | 2.45 |
| 4th | 4.86 | 0.20 | 0.16 | 2.61 |
| 5th | 5.13 | 1.00 | 0.01 | 2.26 |

This extraction of the leach solution shows that the organic solution of 6-dodecylquinaldinic acid extracts copper from the aqueous solution at a high preferential rate until the organic phase becomes well loaded with copper. The figures on the iron concentration shown that the AQA does extract iron to some extent from the aqueous solution, and where the aqueous solution has substantially all of the copper extracted, iron is also extracted but as the organic solution becomes more heavily loaded with copper, additional copper selectively replaces iron which has been chelated by the AQA, and the aqueous phase is actually selectively reloaded with iron from the organic phase. Even if the chelate does contain some iron, copper is extracted and iron released to enrich the aqueous phase with iron, while removing copper from the aqueous phase.

EXAMPLE XV

The loaded organic solution from example XIV was stripped with a 20 percent by weight sulfuric acid solution. Equal volumes of the organic phase and the 20 percent acid stripping phase were used. The following table shows the concentration of copper and iron left in the organic solution after stripping with four successive portions of 20 percent acid.

|  | Concentration of copper grams/liter in organic phase | Concentration of iron grams/liter in organic phase |
| --- | --- | --- |
| 1st strip | 2.29 | 0.01 |
| 2nd | 1.35 | 0.01 |
| 3rd | 1.00 | 0.01 |
| 4th | 0.85 | 0.01 |

EXAMPLE XVI

A run was performed using leach liquor similar to that used in example XiV but with 5 percent of AQA from example XIII to kerosene, after the AQA extract had been washed with twice its volume of 10 percent caustic solution and then reacidified. At the 5 percent level in kerosene the results on extraction were found to be:

|  | Copper concentration grams/liter | | Iron concentration grams/liter | |
| --- | --- | --- | --- | --- |
|  | Organic phase | Aqueous phase | Organic phase | Aqueous phase |
| 1st | 1.27 | 0.00 | 0.34 | 1.77 |
| 2nd | 2.49 | 0.05 | 0.02 | 2.43 |
| 3rd | 2.95 | 0.81 | 0.00 | 2.13 |
| 4th | 3.04 | 1.18 | 0.00 | 2.11 |
| 5th | 3.08 | 1.23 | 0.00 | 2.11 |
| 6th | 3.08 | 1.27 | 0.00 | 2.11 |

EXAMPLE XVII

A run was performed similar to example XU extracting with 20 percent sulfuric acid the organic phase from the preceding

EXAMPLE XVI

The results were found to be:

|  | Concentration of copper grams/liter in organic phase | Concentration of iron grams/liter in organic phase |
| --- | --- | --- |
| 1st strip | 1.37 | 0.00 |
| 2nd | 1.06 | 0.00 |
| 3rd | 1.00 | 0.00 |

In actual mining operations, the results are not readily set forth in tabular from because the leach solution may be fairly concentrated copper containing leach in a highly acid solution where a roasted ore is extracted with a fairly strong acid, down to an extremely dilute solution containing low quantities of both copper and iron. For example, the feed may be a naturally occuring stream or water taken from a mine, or a leach solution which has percolated through a tailing pile, or acid fed through a stripped overburden which does not contain sufficient copper to warrant mining or ore processing through a normal mill circuit, but yet which contains sufficient copper that dilute acid leaches copper therefrom, over a long period of time. As copper is oxidized from the sulfides to the oxides by bacterial action and the acid percolates slowly through the piles of copper-containing overburden a dilute leach solution containing copper is obtained. The copper leach solution can contain from less than ½ gram per liter to 10 pr more grams per liter of copper in the acidic aqueous phase. Usually a concentration of around 0.7 to 1.5 grams per liter of copper is closer to conventional practice. It is to be stressed that the present extraction is designed to work with such acidic copper containing streams as they are found and not necessarily at concentrations which have adjusted for the convenience of the extraction system.

Similarly the extraction can be one that occurs naturally canyon impermeability in a matter of hours in a leach tank or one that occurs over a period of years in tailing dumps. The leach bed can be a natually occuring canyon (or one in which an asphalt lining has been placed on the surface to give improved water impermeability with an entire canyon filled; and the leaching occuring over a period of years through the entire canyon containing millions of tons of low-copper content minerals.

Variations in the conditions of the leaching, the countercurrent extraction, and the stripping are readily adjusted to maximize the economic recovery from particular ore beds which are available for processing at a particular time and plate. Such variations are within the scope of the present invention.

The ratio of the weights of extractant in the organic solvent, that is the AQA in the water immiscible solvent phase, to the aqueous copper leach solution may vary widely. If the copper concentration is high, obviously a larger volume of the AQA-solvent is required to extract the copper than if the copper concentration is comparatively low. The number of stages of counter current extraction varies with the type of equipment, and other flow sheet details. For conventional-type extractors, from three to nine stages normally can be considered as an economical range for either the AQA-solvent extraction of the copper, or for the strong acid stripping of the copper from the copper loaded chelate to form the electrolytic cell feed. The ratio of weights of the aqueous acid leach to the AQA-solvent in each stage is advantageously within the range of about 10:1 to 1:10—although plants can be operated outside of this range. The rate of flow of the solvent phase is not necessarily the same as the rate of flow as the aqueous acid leach solution introducing the copper. With more stages, a more completely copper loaded solvent phase, or strong acid phase is obtainable, but the cost of equipment is higher.

EXAMPLE XVIII

As illustrative shown in the drawing, an ore bed consisting of the mine tailings form a copper mill was treated by slowly spraying on the surface a dilute sulfuric acid solution in part consisting of dilute sulfuric acid but mainly consisting of the extracted aqueous solution of leaching acid which penetrated slowly through the mine tailings, so that the leaching time was on the order of months. As the aqueous acid leaching solution, now containing copper, slowly drains from the bottom of the mine tailing, the solution is filtered to remove any solid particles and then fed into a liquid countercurrent extraction column in which the feed volume is such that approximately one-third as must solvent phase is present as aqueous phase, with the aqueous phase running through the system somewhat faster so that a major part of the copper os chelated with the 6-dodecylquinaldinic acid, dissolved at about 5 percent by weight in the solvent phase. The solvent is 25 percent kerosene, with the boiling point range starting at 150° C. and about 70 percent of a liquid aromatic petroleum fraction having a flash point of 150° F. and sold as "Solvesso 150" and 5 percent commercial grade isodecyl alcohol. The alcohol has from $C_9$ to $C_{14}$, components, both branched and straight chain, but is predominantly isodecanol. The 6-dodecylquinaldinic acid is from a commercial grade of para-dodecylaniline which contained an average of about 12 carbons in the side chain, but has species varying from about $C_8$ to $C_{14}$ in the side chain.

The extraction is conducted at ambient mine temperature of about 65° F. with the extracted aqueous acid being recycled to the mine tailings and the copper loaded chelate organic solvent being cycled to the countercurrent stripper to which 20 percent sulfuric acid plus recycled strong acid was fed. The extracted organic solution AQA containing some copper which was not stripped is recycled to the aqueous acid leaching extractor and the strong and the strong acid solution containing copper sulfate is fed to an electrolytic cell, as shown in the drawing. The copper is separated as electrolytic grade copper, with oxygen being evolved at the other electrode. The electrolytic cell is of a conventional construction. To obtain higher current efficiency only around 40–50 percent of the copper is electrolized, with the rest remaining in the strong acid which is recycled to the countercurrent stripping column.

Preferable operating embodiments in any one mill is in part controlled by the cost of electric poser, cost of the various chemicals, and often varied to fit equipment which is already in the mill.

Those skilled in the art appreciate such interacting variants, and the fact that the ore bed can be any form of ore bed and frequently is varied in a single mine over a period operation.

The copper chelates of the present long chain alkyl quinaldinic acids can be represented by the formula:

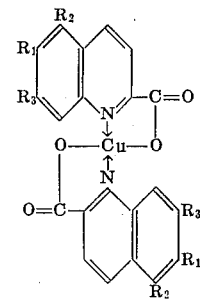

where $R_1$, $R_2$, and $R_3$ are each selected from the group consisting of hydrogen and an alkyl group, and the total number of carbons in said $R_1$, $R_2$, and $R_3$ is at least about six, and not greater than about 30.

While the chelate formula appears to be a correct representation of the reaction product of the copper and the long chain alkyl quinaldinic acids, other formulas or representations may be used it is is the material and not the formula that is effective, and any difference in the formula representing the material obviously has no effect on the compounds themselves. I claim:

I claim

1. A process of recovering copper from aqueous acid leach solution containing ore body impurities which comprises:
   intimately mixing with an aqueous acid leach solution containing ore body impurities
   at least one water-insoluble, oil-soluble long chain quinaldinic acid having the formula

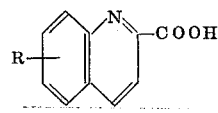

where R represents at least one alkyl group of a total of about six 25 carbon atoms, not necessarily straight chain, and attached in the 5 to 7 positions on the quinaldinic acid rings
   dissolved in the comparatively nonflammable water-immiscible organic solvent selected from the group consisting of liquid petroleum fractions, liquid monocyclic aromatic fractions, mixtures thereof, and not more than 25 percent of an intermediate chain alkanol
   extracting the copper as a copper chelate into the said organic solvent,
   separating the organic solvent, stripping the copper from said organic solvent with a highly acidic solution and electrolyzing, and thereby recovering the copper from, said stripping solution.

2. The process of claim 1 in which the long chain quinaldinic acid is a 6-alkyl quinaldinic acid with from about 6 to 20 carbon atoms in the alkyl group.

3. The process of claim 1 in which the long chain quinaldinic acid is 6-dodecylquinaldinic acid, of a commercially pure grade.

4. The process of claim 2 in which the stripped said organic solvent containing said long chain quinaldinic acid is recycled to the mixing step, and the said solvent is a mixture of kerosene, an aromatic petroleum fraction, and not more than 25 percent $C_9$ to $C_{14}$ alkanol.

5. The process of claim 4 in which the electrolyzed highly acidic solution is recycled to the stripping step.

* * * * *

PAGE 1

UNITED STATES PATENT OFFICE
CERTIFICATE OF CORRECTION

Patent No. 3,637,476　　　　Dated January 25, 1972

Inventor(s) MICHAEL PANG

It is certified that error appears in the above-identified patent and that said Letters Patent are hereby corrected as shown below:

Column 1, line 27, after the numeral "610" and before the word "Apr.," please insert --(--.

Column 1, line 28, after the word "News," and before the word "Apr.," please delete "(".

Column 1, line 30, please change the number "3,244,873" to read --3,224,873--.

Column 2, line 75, after the word "million" and before the word "losses," please delete the word "reduced" and insert in its stead the words --to reduce--.

Column 3, line 23, after the word "often" and before the word "commercially," please change the word "advantages" to read --advantageous--.

Column 3, line 25, after the word "boiling" and before the word "the," please change the word "that" to read --than--.

Column 3, line 66, please insert a comma (,) before the word "acids" and after the word "copper."

Column 4, lines 8 and 9, after the word "quinoline." please delete the words "substituted quinolines."

Column 4, lines 12 and 13, after the word "yield," please delete the word "quinoline" and insert in lieu thereof the words --substituted quinolines--.

Column 4, line 45, second occurrence, please cancel the term "because."

PAGE 2

UNITED STATES PATENT OFFICE
CERTIFICATE OF CORRECTION

Patent No. 3,637,476      Dated January 25, 1972

Inventor(s) MICHAEL PANG

It is certified that error appears in the above-identified patent and that said Letters Patent are hereby corrected as shown below:

Column 5, line 75, after the word "through," please change the word "the" to read --and--.

Column 8, line 58, please change the word "produce" to read --product--.

Column 8, line 64, second occurrence, please cancel the term "and."

Column 8, line 72, before the word "slowly" the term "$SnCl_2 \cdot 2_2O$" should read --$SnCl_2 \cdot 2H_2O$--.

Column 9, line 1, the word "introduced" should read --introduce--.

Column 9, line 2, the word "aklylaniline" should read --alkylaniline--.

Column 9, line 19, the word "either" should read --ether--.

Column 9, line 26, the word "introduced" should read --introduce--.

Column 9, line 27, the word "p-dodecylanilne" should read --p-dodecylaniline--.

Column 9, line 37, "130—140°0.05" should read --130—140° at .05--.

Column 9, line 48, the word "milliliters" should read --milliliter--.

PAGE 3

UNITED STATES PATENT OFFICE
CERTIFICATE OF CORRECTION

Patent No. 3,637,476             Dated January 25, 1972

Inventor(s)  MICHAEL PANG

It is certified that error appears in the above-identified patent and that said Letters Patent are hereby corrected as shown below:

Column 9, line 55, the word "introduced" should read --introduce--.

Column 9, line 57, after the word "Add" and before the word "milliliters" please insert the number --222--.

Column 10, line 21, the word "while" should read --white--.

Column 10, line 30, "3.77.4" should read --377.4--.

Column 10, line 35, the word "taken" should read --takes--.

Column 10, line 36, after the word "hours" and before "20°-25°C.," please insert the word --at--.

Column 10, lines 41 and 42, after the word "kilogram" and before the word "of" please insert the word --portions--.

Column 10, lines 41 and 42, after the word "of" please delete the words "ether portions of."

Column 10, line 54, after the word "acid" and before the figure "2.6," please insert a comma (,).

Column 11, line 14, the word "ad" should read --as--.

Column 11, line 16, the word "graphs" should read --g--.

Column 11, line 51, after the word "solution" and before the word "kerosene," please delete the word "of" and insert in its stead the word --and--.

PAGE 4

UNITED STATES PATENT OFFICE
CERTIFICATE OF CORRECTION

Patent No. 3,637,476      Dated January 25, 1972

Inventor(s) MICHAEL PANG

It is certified that error appears in the above-identified patent and that said Letters Patent are hereby corrected as shown below:

Column 11, line 72, the word "shown" should read --show--.

Column 12, line 27, please change "XiV" to read --XIV--.

Column 12, line 28, the word "to" should read --in--.

Column 12, line 44, please change "XU" to read --XV--.

Column 12, line 45, after the word "preceding," please add the following: --example XVI. The results were found to be:--.

Column 12, line 47, please delete "EXAMPLE XVI."

Column 12, line 49, please delete "The results were found to be:".

Column 12, line 57, after the word "not" and before the word "readily" please insert the word --as--.

Column 12, line 58, the word "from" should read --form--.

Column 12, line 58, after the word "be" and before the word "fairly," please insert the word --a--.

Column 12, line 73, "pr" should read --or--.

Column 13, line 2, the word "extraction" should read --extractant--.

Column 13, lines 6 and 7, after the word "occurs" and before the word "in," please delete the words "naturally canyon impermeability."

FORM PO-1050 (10-69)

PAGE 5

UNITED STATES PATENT OFFICE
CERTIFICATE OF CORRECTION

Patent No. 3,637,476     Dated January 25, 1972

Inventor(s) MICHAEL PANG

It is certified that error appears in the above-identified patent and that said Letters Patent are hereby corrected as shown below:

Column 13, line 11, after the word "impermeability," please insert a closing parenthesis ( ) ).

Column 13, line 18, please change the word "plate" to read --place--.

Column 13, line 44, after the word "illustrative" and before the word "shown," please insert the word --and--.

Column 13, line 55, please change the word "must" to read --much--.

Column 13, line 57, please change "os" to read --is--.

Column 14, line 2, second occurrence, please cancel the words "and the strong."

Column 14, line 12, the word "poser" should read --power--.

Column 14, line 44, after the word "used" and before the word "it," please insert a dash (—).

Column 14, line 44, second occurrence, please delete the word "is."

Column 14, line 47, please delete "I claim:".

Column 14, line 66, after the word "six" and before the number "25," please insert the words --to about--.

Column 14, line 68, the word "the" should read --a--.

Signed and sealed this 7th day of November 1972.

(SEAL)
Attest:

EDWARD M. FLETCHER, JR.
Attesting Officer

ROBERT GOTTSCHALK
Commissioner of Patents